(12) United States Patent
Liao

(10) Patent No.: US 6,978,522 B2
(45) Date of Patent: Dec. 27, 2005

(54) CLASP DEVICE FOR SHEET MATERIALS

(76) Inventor: Eric Liao, P.O.Box 63-99, Taichung (TW) 406

( * ) Notice: Subject to any disclaimer, the term of this patent is extended or adjusted under 35 U.S.C. 154(b) by 0 days.

(21) Appl. No.: 10/800,524

(22) Filed: Mar. 12, 2004

(65) Prior Publication Data
US 2005/0198791 A1 Sep. 15, 2005

(51) Int. Cl.[7] .............................................. A44B 17/00
(52) U.S. Cl. ............................ 24/459; 24/464; 24/662
(58) Field of Search ......................... 24/459, 458, 343, 24/72.5, 464, 470, 472, 474, 476, 478, 479, 24/713.6, 714.3, 708.6, 709.7, 67 P, 662; 5/494, 498; 402/1; 40/302; 16/2.1; 160/404; 135/119, 120.1; 114/108

(56) References Cited

U.S. PATENT DOCUMENTS

| | | | |
|---|---|---|---|
| 3,748,696 A * | 7/1973 | Martin ......................... 40/302 |
| 3,757,389 A * | 9/1973 | Wiland ....................... 24/708.6 |
| 4,074,396 A * | 2/1978 | Swimley .................... 24/709.1 |
| 4,175,305 A | 11/1979 | Gillis ....................... 24/245 R |
| 4,660,240 A | 4/1987 | Hutton et al. .................. 5/451 |
| 4,757,662 A | 7/1988 | Gasser ........................ 52/410 |
| 5,031,268 A * | 7/1991 | McCabe ....................... 16/2.1 |
| 5,046,222 A | 9/1991 | Byers et al. .................. 24/343 |
| 5,209,029 A | 5/1993 | Foerst ........................... 52/63 |
| 5,222,988 A * | 6/1993 | Riley ........................... 16/2.1 |
| 5,339,884 A * | 8/1994 | Angerman .................. 160/330 |
| 5,655,271 A | 8/1997 | Maxwell-Trumble et al. . 24/459 |
| 5,826,312 A * | 10/1998 | Schroder et al. ............. 24/458 |
| 6,199,247 B1 | 3/2001 | Tsai ............................ 24/343 |
| 2005/0063773 A1 * | 3/2005 | Cameron .................... 403/373 |

* cited by examiner

Primary Examiner—Robert J. Sandy
(74) Attorney, Agent, or Firm—Charles E. Baxley

(57) ABSTRACT

A clasp device for attaching to a sheet material includes a male member having a piercing member for piercing through the sheet material, and a female member having a bore to receive the piercing member of the male member, and to secure the male member and the female member to the sheet material, and to prevent the male member and the female member from being disengaged from the sheet material. The piercing member of the male member and the female member include engaging elements engageable with each other, to solidly secure the male member and the female member together.

8 Claims, 3 Drawing Sheets

CLASP DEVICE FOR SHEET MATERIALS

BACKGROUND OF THE INVENTION

1. Field of the Invention

The present invention relates to a clasp device, and more particularly to a clasp device having a piercing member for piercing through sheet materials or members.

2. Description of the Prior Art

Various kinds of typical clasp devices have been developed and provided for attaching to or for gripping fabric materials, film materials, sheet materials, or the like, and normally comprise a ring or female member, and a projecting or male member engageable into the ring or female member, to detachably secure or attach the clasp devices onto the sheet materials.

For example, U.S. Pat. No. 4,175,305 to Gillis, U.S. Pat. No. 4,660,240 to Hutton et al., U.S. Pat. No. 4,757,662 to Gasser, U.S. Pat. No. 5,046,222 to Byers et al., U.S. Pat. No. 5,209,029 to Foerst, U.S. Pat. No. 5,655,271 to Maxwell-Trumble et al., and U.S. Pat. No. 6,199,247 to Tsai disclose several of the typical clasp devices each comprising a projecting or male member engageable into a ring or female member, to detachably secure or attach the clasp devices onto the sheet materials, and thus for attaching the sheet materials to the other hanger or support members.

However, the typical clasp devices may be used for attaching to the sheet materials having a smaller or less thickness only, such as thinner fabric materials, thinner film materials, thinner sheet materials, or the like.

However, for those sheet materials having greater thicknesses, such as canvas, the projecting or male member may not engage the thick canvas into the ring or female member, such that the thick canvas may not be easily and solidly secured or attached between the male member and the female member, and such that the thick canvas may be easily disengaged from the male member and the female member.

The present invention has arisen to mitigate and/or obviate the afore-described disadvantages of the conventional clasp devices.

SUMMARY OF THE INVENTION

The primary objective of the present invention is to provide a clasp device including a piercing member for piercing through sheet materials or members, and for allowing the clasp device to be attached to sheet materials of greater thicknesses.

In accordance with one aspect of the invention, there is provided a clasp device for attaching to a sheet material, the clasp device comprising a male member including a piercing member extended therefrom for piercing through the sheet material, and a female member including a bore formed therein to receive the piercing member of the male member, and to attach and secure the male member and the female member to the sheet material, and to prevent the male member and the female member from being disengaged from the sheet material.

The piercing member of the male member includes a first engaging element provided thereon, the female member includes a second engaging element provided thereon and engageable with the first engaging element of the male member, to solidly secure the male member and the female member together.

The first engaging element includes at least one recess formed in the piercing member of the male member, and the second engaging element includes at least one protrusion formed in the female member, and engageable with the recess of the piercing member.

The piercing member of the male member includes a drill tip provided thereon, for easily engaging through the sheet material. The drill tip of the piercing member of the male member includes at least one cutting edge formed thereon.

The male member includes a chamber formed therein, the female member includes a projection extended therefrom for engaging with and for forcing the sheet material into the chamber of the male member, and for solidly securing the sheet material between the female member and the male member. The female member includes at least one notch formed in the projection, to form at least one spring leg.

The female member includes at least one depression formed therein for facilitating rotation of the female member relative to the male member. The male member may also incluude at least one depression formed therein for facilitating holding of the male member. The male member includes a ring attached thereto for coupling purposes.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
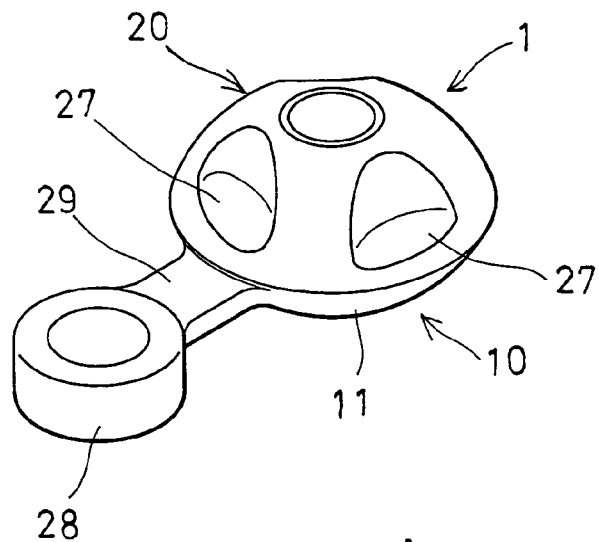
FIG. 1 is a perspective view of a clasp device in accordance with the present invention.
Figure 2:
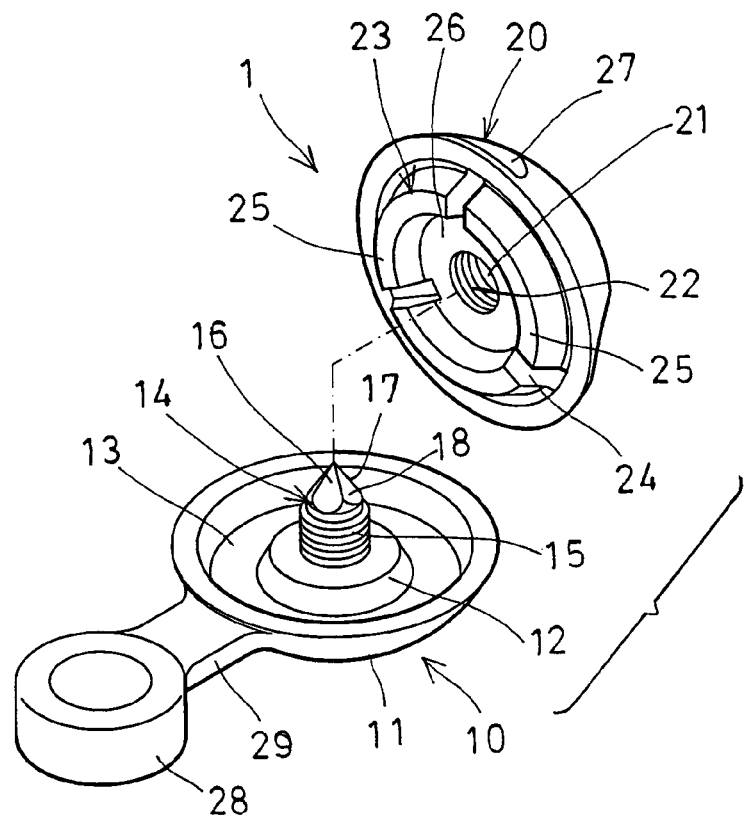
FIG. 2 is an exploded view of the clasp device.
Figure 3:
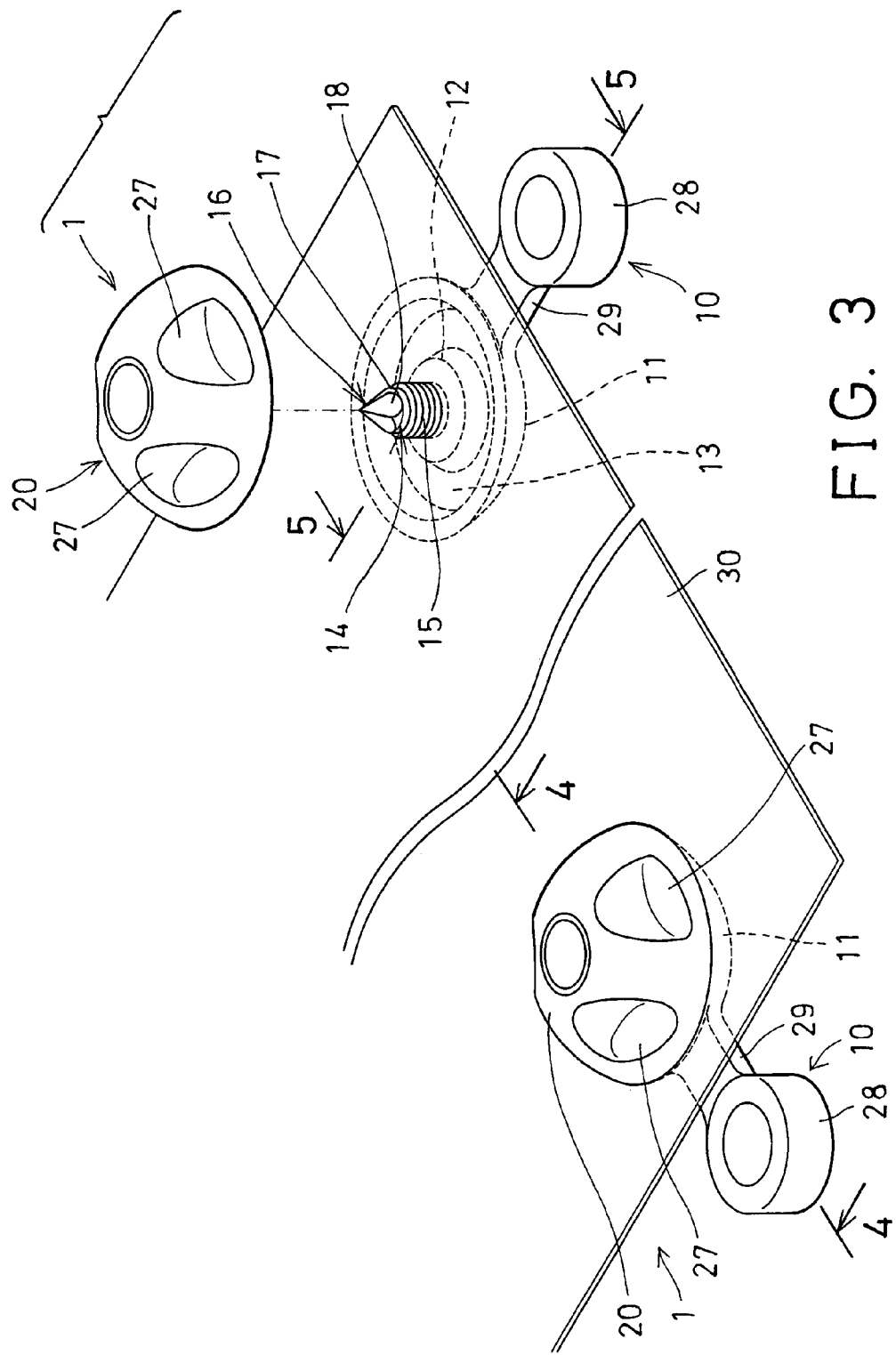
FIG. 3 is a partial exploded view illustrating the operation of the clasp device.
Figure 5:
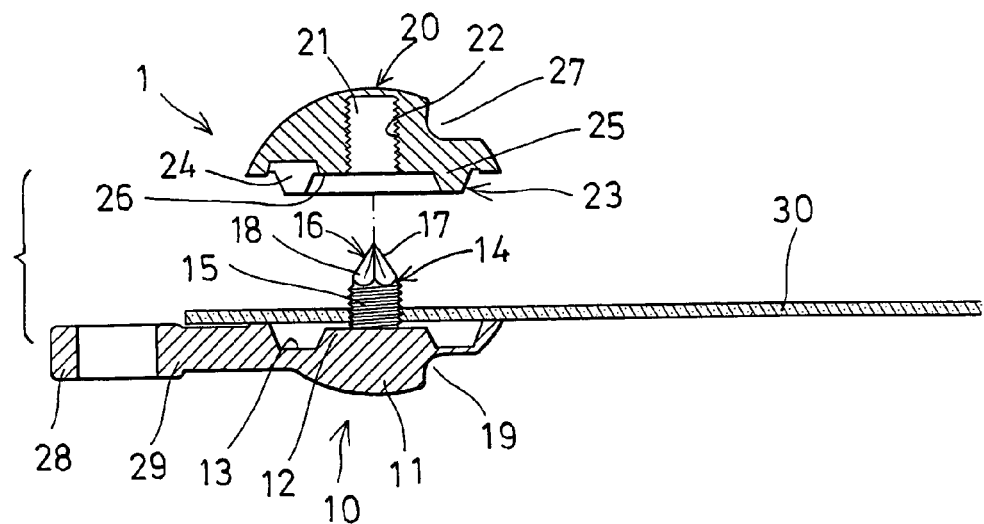
FIGS. 4, 5 are cross sectional views of the clasp device, taken along lines 4—4 and 5—5 FIG. 3 respectively.
Figure 4:
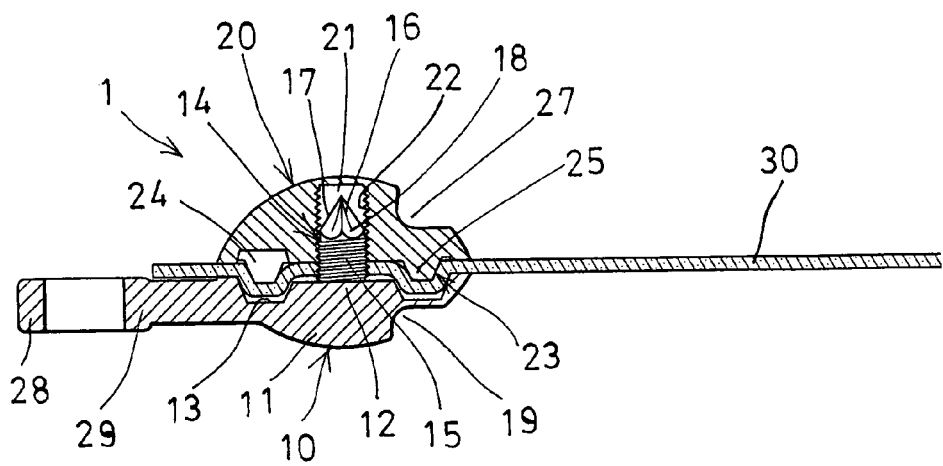

Referring to the drawings, and initially to FIGS. 1 and 2, a clasp device 1 in accordance with the present invention comprises a male member 10 and a female member 20 to be engaged with each other and to be attached onto one or more sheet materials 30 (FIGS. 3–5), for coupling the sheet materials 30 to the other hanger or support members (not shown).

For example, the male member 10 includes a base 11 having a swelling 12 extended therein, such as extended into a chamber 13 thereof, to form or define an annular shape for the chamber 13 thereof, and includes a piercing member 14 extended from the base 11, such as extended from the swelling 12 of the base 11, for engaging or piercing through the sheet materials 30, and thus for allowing the male member 10 to be solidly secured or attached to the sheet materials 30.

The piercing member 14 includes an outer thread or one or more peripheral engaging elements 15, such as peripheral protrusions or recesses 15 formed on the outer peripheral portion thereof, and includes a tip 16, such as a drill tip 16 extended or provided thereon for easily engaging through the sheet materials 30 having greater thicknesses. For example, the drill tip 16 may include one or more cutting edges 17 and one or more depressions or surfaces 18 formed therein.

The female member 20 includes a bore 21 formed therein to receive the piercing member 14, and to be attached or secured to the male member 10 with such as force-fitted engagements, in order to solidly attach or secure the clasp device 1 to the sheet materials 30, and to prevent the clasp device 1 from being disengaged from the sheet materials 30.

It is preferable that the female member 20 includes an inner thread or one or more peripheral engaging elements 22, such as peripheral recesses or protrusions 22 formed in or extended into the bore 21 thereof, and engageable with the corresponding outer thread or peripheral recesses or peripheral engaging elements 15 of the piercing member 14 (FIG. 4), to further solidly attach or secure the female member 20 to the male member 10, and to prevent the female member 20 from being disengaged from the male member 10.

The female member 20 includes a peripheral projection 23 extended therefrom for engaging with the sheet materials 30, and/or for forcing the sheet materials 30 into the annular chamber 13 of the male member 10 (FIG. 4), to further solidly attach or secure the sheet materials 30 to the female member 20 and the male member 10, and to prevent the sheet materials 30 from being disengaged from the female member 20 and the male member 10.

The female member 20 preferably includes one or more notches 24 formed in the peripheral projection 23, to form or define one or more spring legs 25, and thus to allow the springs 25 to be deformed or shaped according to the materials of the sheet materials 30 and/or the shapes of the annular chamber 13 of the male member 10. It is further preferable that the female member 20 includes a cavity 26 formed therein to receive the swelling 12 of the base 11, and to further solidly attach or secure or anchor the sheet materials 30 to the female member 20 and the male member 10.

It is preferable that the female member 20 includes one or more depressions 27 formed therein, such as formed in the outer peripheral portion thereof, for allowing the female member 20 to be easily rotated or actuated relative to the male member 10. It is also preferable that the male member 10 includes one or more depressions 19 formed therein (FIGS. 4, 5), such as formed in the outer peripheral portion thereof, for allowing the male member 10 to be easily rotated or actuated or held by the users.

The clasp device 1 may further include a ring 28 attached to such as the female member 20 or attached to the male member 10 with a shank 29, for allowing the clasp device 1 and thus the sheet materials 30 to be easily coupled to the other hanger or support members.

It is to be noted that the provision or the extension of the piercing member 14 from the base 11 of the male member 10 allows the male member 10 to be easily engaged or pierced through the sheet materials 30, and thus to be easily and solidly secured or attached to the sheet materials 30.

Accordingly, the clasp device in accordance with the present invention includes a piercing member for piercing through sheet materials or members, and for allowing the clasp device to be attached to sheet materials of greater thicknesses.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A clasp device for attaching to a sheet material, said clasp device comprising:

a male member including a piercing member extended therefrom for piercing through the sheet material, and including a chamber formed therein, and a female member including a bore formed therein to receive said piercing member of said male member, and to attach and secure said male member and said female member to the sheet material, and to prevent said male member and said female member from being disengaged from the sheet material, said female member including a projection extended therefrom for engaging with and for forcing the sheet material into said chamber of said male member, and for solidly securing the sheet material between said female member and said male member, and said female member including at least one notch formed in said projection, to form at least one spring leg.

2. The clasp device as claimed in claim 1, wherein said piercing member of said male member includes a first engaging element provided thereon, said female member includes a second engaging element provided thereon and engageable with said first engaging element of said male member, to solidly secure said male member and said female member together.

3. The clasp device as claimed in claim 2, wherein said first engaging element includes at least one recess formed in said piercing member of said male member, and said second engaging element includes at least one protrusion formed in said female member, and engageable with said at least one recess of said piercing member.

4. The clasp device as claimed in claim 1, wherein said piercing member of said male member includes a drill tip provided thereon, for easily engaging through the sheet material.

5. The clasp device as claimed in claim 4, wherein said drill tip of said piercing member of said male member includes at least one cutting edge formed thereon.

6. The clasp device as claimed in claim 1, wherein said female member includes at least one depression formed therein for facilitating rotation of said female member relative to said male member.

7. The clasp device as claimed in claim 1, wherein said male member includes at least one depression formed therein for facilitating holding of said male member.

8. The clasp device as claimed in claim 1, wherein said male member includes a ring attached thereto for coupling purposes.

* * * * *